G. S. BINCKLEY.
FLUID METER.
APPLICATION FILED SEPT. 8, 1915.
1,241,814.
Patented Oct. 2, 1917.
2 SHEETS—SHEET 1.
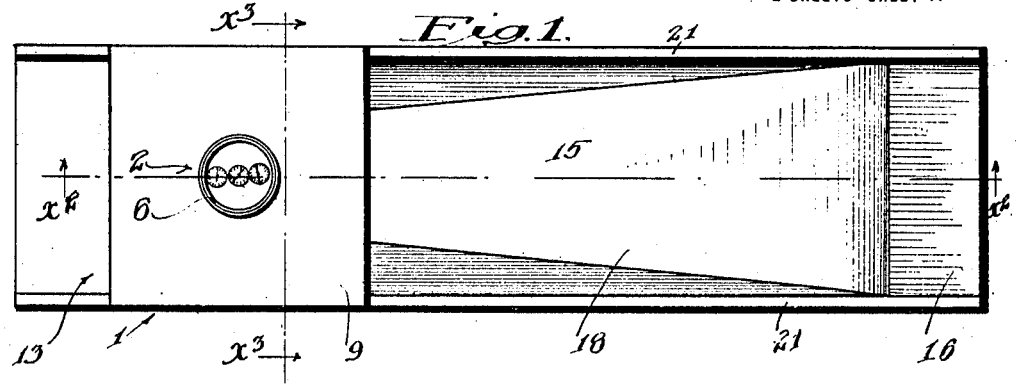
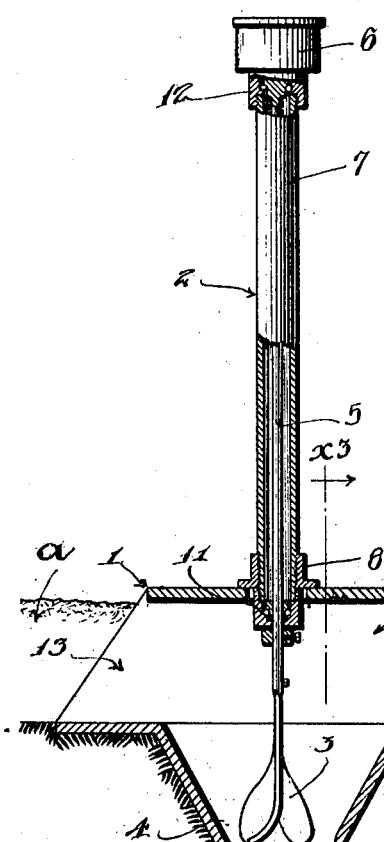
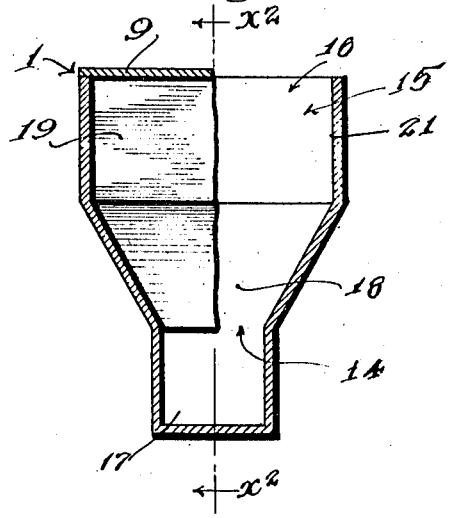
Inventor
George Sydney Binckley G. S. BINCKLEY.
FLUID METER.
APPLICATION FILED SEPT. 8, 1915.
1,241,814.
Patented Oct. 2, 1917.
2 SHEETS—SHEET 2.
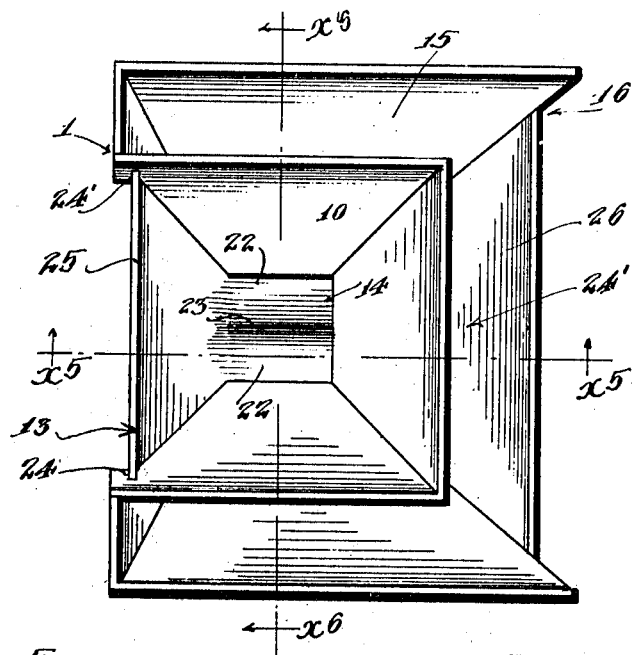
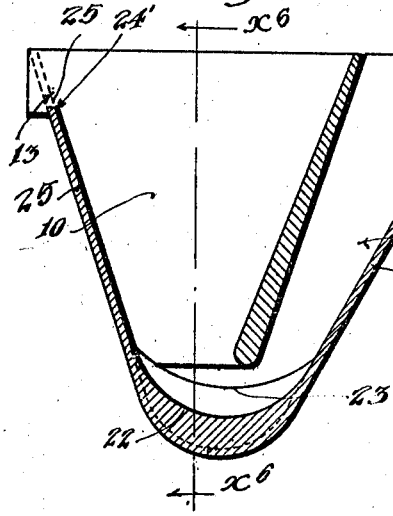
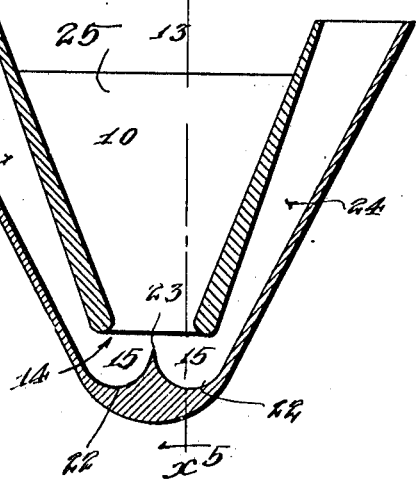
Witnesses:
Sully Russ
George H. Hiles
Inventor
George Sydney Binckley
By Frederick Shyer
Atty

UNITED STATES PATENT OFFICE.

GEORGE SYDNEY BINCKLEY, OF LOS ANGELES, CALIFORNIA, ASSIGNOR, BY MESNE ASSIGNMENTS, TO D. A. STARBUCK AND I. B. FUNK.

FLUID-METER.

1,241,814. Specification of Letters Patent. Patented Oct. 2, 1917.

Application filed September 8, 1915. Serial No. 49,420.

*To all whom it may concern:*

Be it known that I, GEORGE SYDNEY BINCKLEY, a citizen of the United States, residing at Los Angeles, in the county of Los Angeles and State of California, have invented a new and useful Fluid-Meter, of which the following is a specification.

This invention relates to devices designed to measure and register the volume of fluid passing a given point in the channel or tube through which the fluid flows.

An object of this invention is to produce a device of this character which will be inexpensive to manufacture and install so that it can be used extensively in irrigation ditches for the measurement of water passing through said ditches to the land under irrigation, thus enabling the owner of the land or user of the water to readily determine at small expense the amount of water being used by him.

Devices of this character heretofore in practical use are either prohibitively expensive so as to prevent their general use, or are of such construction that the bearings are immersed in the fluid being measured, thereby causing injury to said bearings and consequent falsity of measuring of the quantity of fluid, and are of such construction that the fluid-operated propeller or wheel is liable to become fouled with trash and the like which fouling is a factor in producing falsity of measurements.

Another object of this invention is to produce a device of which the bearings are not immersed in the fluid being measured and of which the propeller blades are of such construction and arrangement relative to the flow of the fluid as to insure said propeller blades against becoming fouled by trash and the like.

Another object is to produce a simple device of this character which will be relatively accurate even for small flows of fluid.

Another object is to produce a construction which will admit of ready installation in an irrigation ditch.

In general, I contribute largely toward the attainment of the foregoing objects by providing a bent tube forming a U-shaped passage, a wheel in one leg of said tube, and a shaft driven by said wheel.

More specifically I provide what I term a bent Venturi tube forming a U-shaped passage expanding from its intermediate portion toward its ends.

Other objects and advantages may appear as the invention is disclosed in detail in the subjoined description and in the drawings filed herewith.

The accompanying drawings illustrate the invention embodied in two somewhat different forms:

Figure 1 is a plan view of a fluid meter built in accordance with this invention.

Fig. 2 is a side elevation mainly in section on line indicated by $x^2$—$x^2$, Figs. 1 and 3.

Fig. 3 is a transverse section on line indicated by $x^3$—$x^3$, Figs. 1 and 2, a portion of the partition or one of the walls of the acceleration chamber being broken away for clearness of illustration.

Fig. 4 is a plan view of another form of the invention than that shown in the preceding figures, the mechanism and the cover of the acceleration chamber being omitted for clearness of illustration.

Fig. 5 is a sectional elevation on line indicated by $x^5$—$x^5$, Figs. 4 and 6.

Fig. 6 is a sectional elevation on line indicated by $x^6$—$x^6$, Figs. 4 and 5.

There is provided, what I term for the purposes of description, a bent Venturi tube 1 and a measuring and registering device 2 mounted so as to bring the axis of the propeller or wheel 3 in line with the axis of the contracted tube, said wheel being just above the bend 4 or at the point of greatest contraction of the tube. The bent Venturi tube 1 forms a U-shaped passage expanding from its middle portion toward its ends. It is understood that the propeller or wheel 3 need not necessarily be of the form shown in the drawings, but may be of any type or form adapted to be rotated by fluids. The wheel 3 is immersed in the fluid and is connected by a shaft 5 to a measuring and registering device 6 or the like of the usual or any preferred construction, said device being mounted on the upper end of a tubular casing 7 which surrounds the shaft 5 and which is screwed at its lower end through a flanged collar 8 mounted on the cover 9 of the acceleration chamber 10 of the tube, the lower end of the casing projecting through the cover 9 and being provided with an antifriction bearing 11 for the shaft 5. The casing 7 is also provided at its upper end with an antifriction bearing 12.

The acceleration chamber 10 is provided with an inlet 13 forming the inlet of the tube and is provided at its bottom with an outlet or contracted throat 14 intermediate of the tube, said inlet and throat in this instance having their axes at right angles to one another.

The acceleration chamber 10 expands upwardly and is spaced apart from the bottom of the upwardly expanding diffusion chamber 15 of the tube 1 and discharges into said diffusion chamber through the throat 14. Said diffusion chamber 15 is provided at the end opposite the inlet 13 with an outlet 16 forming the outlet of the tube, said outlet 16 having its axis substantially coinciding with the axis of the inlet 13 and having its axis at right angles to the axis of the intermediate throat 14.

The structure thus far described is common to both forms of the invention and I will now describe the structure in Figs. 1, 2 and 3 differentiating from the structure in Figs. 4 to 6. In Figs. 1 to 3 the upper part of the acceleration chamber 10 forms a rectangular portion open at one side and substantially square, and the lower portion of said acceleration chamber forms a pyramidic frustum having its smaller end directed toward a curved bottom portion 17 of the diffustion chamber 15 which is provided with a bottom portion 18 sloping upwardly and rearwardly from the curved portion 17. The acceleration and diffusion chambers 10, 15 together form a flume and the rear wall 19 of the diffusion chamber forms a partition in the flume between said chambers and spaced apart from the bottom of said flume. The upper portions of the side walls 21 of the expansion chamber 15 may be vertical and the intermediate portions slope inwardly and downwardly and the lower portions are vertical.

The features in Figs. 4 to 6 differentiating from Figs. 1 to 3 will now be described. In Figs. 4 to 6 the bottom of the diffusion chamber is formed of laterally-diverging transversely and longitudinally curved portions 22 separated by a central rib 23 which is midway of the sides of the throat 14, and the walls of the diffusion chamber diverge outwardly and upwardly from said curved portions and said walls are spaced apart from the outwardly and upwardly diverging walls of the acceleration chamber a greater distance at the top than at the bottom so as to form an upwardly expanding passage 24 on three sides of the acceleration chamber 10.

The side walls of the acceleration chamber 10 are provided near their upper rear corners with notches 24' to receive the upper edge of the front wall 25, the wall 25 thus serving to form one side of the diffusion chamber 15 and also form one side of the acceleration chamber. The upper portion of the wall 25 extending from one notch 24 to the other notch is lower than the upper portions of said wall from the notches to the adjacent corners of the diffusion chamber 15 so as to form the inlet 13, and the rear wall 26 of the diffusion chamber is lower than the side walls thereof so as to form the outlet 16.

In practice, assuming, for example, that the meter is to be used in connection with irrigation ditches, the device will be inserted in the irrigation ditch $a$ with the inlet 13 pointing up stream and the outlet 16 pointing down stream and with the bottom of said inlet and outlet substantially on a level with the bottom of the ditch as indicated in Fig. 2 of the drawings. The water in the ditch $a$ will flow through the inlet 13 and the velocity of flow will be accelerated by the contracted portion 18 of the acceleration chamber and will turn the wheel 3 so as to measure and register, in a manner well understood, the quantity of water passing through the contracted throat 14. The water passes on through said contracted throat 14 into the diffusion chamber 15 and, owing to the gradual enlargement of said diffusion chamber from the throat 14 to the outlet 16, the water will decrease in velocity and the energy represented by the acceleration of the velocity attained at the contracted throat 14 will be restored as static head in the diffusion chamber 15. Hence the loss of head due to flow through this device will be reduced to a minimum.

From the foregoing it is seen that by the use of my device some advantages derivable from the use of an ordinary Venturi tube are obtained and also that the bearings will not deteriorate and furthermore that the wheel will not become fouled by trash and the like as the longitudinal axes of the propeller blades coincide with the line of flow of the fluid in the acceleration chamber so that any trash entering said chamber will readily slip along the edges of the propeller blades and escape therefrom.

It is noted that the form shown in Figs. 1 to 3 offers advantages of construction if wood or metal be employed and that the form shown in Figs. 4 to 6 is especially adapted to be readily cast in cement or metal.

The form shown in Figs. 4 to 6 can be installed with great ease in an irrigation ditch and the like because it is compact and hence will require little excavating for it.

I claim:

1. A fluid meter comprising an acceleration chamber having an inlet in its upper portion and having its side walls sloping inward and downward to form a contracted throat, a diffusion chamber communicating with the lower portion of the acceleration chamber, a vertical shaft rotatively mounted on the acceleration chamber and projecting into said acceleration chamber, a fluid-propelled wheel in said throat fixed on the shaft, and a registering device connected to said shaft.

2. A fluid meter comprising two chambers one inside of the other, the inner chamber being upwardly expanding and having an inlet at its upper portion and having an outlet in its bottom and said outer chamber having an outlet, a shaft having its lower end projecting into the inner chamber, a fluid-operated wheel on the lower end of the shaft, and a registering device connected to said shaft.

3. A fluid meter comprising an acceleration chamber having an inlet in its upper portion and having its side walls sloping inward and downward to form a contracted throat, a diffusion chamber communicating with the lower portion of the acceleration chamber and having upwardly and outwardly sloping walls, a vertical shaft rotatively mounted above the acceleration chamber and projecting down into said acceleration chamber, a fluid-propelled wheel on the lower end of the shaft, and a registering device connected to said shaft.

4. A fluid meter comprising two upwardly and outwardly expanding chambers one inside of the other, the inner chamber having an inlet at its upper portion and having an outlet in its bottom and the outer chamber having an outlet, a shaft having its lower end projecting into the inner chamber, a fluid-operated wheel on the lower end of the shaft, and a registering device connected to said shaft.

5. A fluid meter comprising a chamber having a horizontally disposed inlet and having an outlet, the axis of the outlet being vertical, a casing projecting up from the top of the chamber, a shaft journaled near the upper end of said casing and projecting into said chamber, a fluid-operated wheel on the lower end of the shaft, and a registering device connected to the upper end of said shaft.

6. A fluid meter comprising a flume having an upright partition spaced apart from the bottom of the flume, said flume expanding upwardly from the lower edge of the partition on both sides thereof, a fluid-operated wheel at approximately the level of the lower edge of the partition having its axis coinciding with the direction of the line of flow of the fluid adjacent the wheel, and a registering device operated by said wheel.

In testimony whereof, I have hereunto set my hand at Los Angeles, California, this 1st day of September, 1915.

GEORGE SYDNEY BINCKLEY.

In presence of—
GEORGE H. HILES,
ANNA F. SCHMIDTBAUER.

Copies of this patent may be obtained for five cents each, by addressing the "Commissioner of Patents, Washington, D. C."